US006978982B1

(12) United States Patent
Jin

(10) Patent No.: US 6,978,982 B1
(45) Date of Patent: Dec. 27, 2005

(54) STRUT SPRING COMPRESSOR TOOL

(76) Inventor: Gang Jin, 10439 N. Stelling Rd., Cupertino, CA (US) 95014

( * ) Notice: Subject to any disclaimer, the term of this patent is extended or adjusted under 35 U.S.C. 154(b) by 0 days.

(21) Appl. No.: 10/993,878

(22) Filed: Nov. 19, 2004

(51) Int. Cl.[7] .................................................. B60P 1/48
(52) U.S. Cl. .......................... 254/10.5; 29/227; 29/238
(58) Field of Search ......................... 254/10.5; 29/227, 29/225; 269/207, 212, 215; 411/104

(56) References Cited

U.S. PATENT DOCUMENTS 4,219,918 A * 9/1980 Klann ......................... 29/227
4,732,365 A * 3/1988 Kloster ....................... 254/10.5
5,954,314 A * 9/1999 Weisshaar .................. 254/10.5
5,966,788 A * 10/1999 Klann ......................... 29/227

* cited by examiner

*Primary Examiner*—Lee D. Wilson
(74) *Attorney, Agent, or Firm*—Schein & Cai LLP; James Cai, Esq.

(57) ABSTRACT

A tool for compressing a coil spring includes a forcing screw having a threaded portion and a non-threaded portion, a first clamping member rotatable about the non-threaded portion, and a second clamping member rotatable about the threaded portion.

6 Claims, 4 Drawing Sheets

STRUT SPRING COMPRESSOR TOOL

BACKGROUND OF THE INVENTION

The present invention generally relates to automotive tools and more particularly to a strut spring compressor tool.

Various strut spring compressor devices are known in the prior art. For example U.S. Pat. No. 3,982,730 entitled “Strut Spring Compressor” discloses a device including two spring compressing plates which are U-shaped and which oppose each other, and a threaded shaft which, when turned by an external force, changes the distance between the spring compressing plates so as to compress the strut spring.

U.S. Pat. No. 4,295,634 entitled “Strut Compressor” discloses a fluid operated piston-cylinder mounted to an adjustable upper platen to provide compression between a push platen and a lower base platen. U.S. Pat. No. 4,395,020 entitled “Strut Compressor” discloses a fluid-operated piston-cylinder which drives a first platen toward a second platen to compress a MacPherson strut mounted between the two platens, the first platen being pivotally mounted for self-adjustment to accommodate many different strut sizes and designs.

Another strut compressor is disclosed in U.S. Pat. No. 4,502,664 entitled “MacPherson Spring Compressor”. The compressor includes a drive mechanism to move a strut clamp assembly toward and away from the front of the frame. Upper and lower positioning assemblies are vertically movable with respect to the frame to accommodate MacPherson struts of different sizes and spring offsets, with the upper positioning assembly being vertically adjustable independently of the lower positioning assembly and the lower positioning assembly being vertically adjustable with respect of the frame.

U.S. Pat. No. 4,558,500 entitled “Spring Compressor for MacPherson Strut Suspension Assemblies” discloses a spring compressor including a lower clamping member adapted to be secured to the portion of the cylindrical shroud of the MacPherson strut located below the associated helical spring platform. A pair of spaced apart elongate threaded shank members are mounted on the clamping member and extend upwardly where they are threadably connected to a pair of spaced apart upper spring engaging hooks.

Other strut compression tools known in the prior art include U.S. Pat. No. 4,732,365 entitled “Bench Mounted Spring Compressor”, U.S. Pat. No. 4,872,644 entitled “Motor Vehicle Servicing Tool”, U.S. Pat. No. 5,031,294 entitled “Strut Spring Compressor”, U.S. Pat. No. 6,129,339 entitled “Strut Spring Compression”, and U.S. Pat. No. 6,616,126 entitled “Strut Spring Compressor Tool and Method”.

The strut compression tools of the prior art are of various types and are widely used. However, these tools suffer from many disadvantages. For example, many such tools require the use of adapters to accommodate the wide variety of different types of strut assemblies. Further, many such tools are bulky and require a large space around the strut assembly being worked on. Additionally, many such strut compression tools are difficult to attach to the coil spring of the strut assembly and may release from a compressed coil spring creating a safety hazard.

As such there is a need in the art for a strut spring compressor tool that is easily adaptable to fit strut assemblies of various sizes and configurations. Preferably the strut spring compressor tool is securely engageable to the coil spring of the strut assembly so as to retain a compressed coil spring and thereby ensure the safety of a user.

SUMMARY OF THE INVENTION

In accordance with one aspect of the invention, a tool for compressing a coil spring includes a forcing screw having a threaded portion and a non-threaded portion, a first clamping member rotatable about the non-threaded portion, and a second clamping member rotatable about the threaded portion.

In another aspect of the invention, a tool for compressing a coil spring includes a forcing screw having a threaded portion and a non-threaded portion, a first clamping member rotatable about the non-threaded portion, a threaded sleeve rotatable about the threaded portion, and a second clamping member rotatable about a non-threaded portion of the threaded sleeve.

In yet another aspect of the invention, a tool for compressing a coil spring includes a forcing screw having a threaded portion, a non-threaded portion and a head, a first clamping member rotatable about the non-threaded portion, a first washer assembly disposed between the first clamping member and the forcing screw head, a threaded sleeve rotatable about the threaded portion, the threaded sleeve having a head portion, a second clamping member rotatable about a non-threaded portion of the threaded sleeve, and a second washer assembly disposed between the second clamping member and the threaded sleeve head portion.

In yet another aspect of the invention, a method of compressing a coil spring includes the steps of providing a forcing screw having a threaded portion and a non-threaded portion, engaging the coil spring with a first clamping member, engaging the coil spring with a second clamping member, disposing the first clamping member rotatably about the non-threaded portion, disposing the second clamping member threadingly about the threaded portion, and rotating the forcing screw.

In another aspect of the invention, a method of compressing a coil spring includes the steps of providing a forcing screw having a threaded portion and a non-threaded portion, engaging the coil spring with a first clamping member, engaging the coil spring with a second clamping member, disposing the first clamping member rotatably about the non-threaded portion, disposing the second clamping member onto a non-threaded portion of a threaded sleeve, disposing the threaded sleeve onto the threaded portion; and rotating the threaded sleeve.

There has been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended herein.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE INVENTION

The present invention generally provides a strut spring compressor tool that includes a pair of removable clamping members attachable to a forcing screw. The clamping members may be moved relative to one another along the forcing screw by means of either a forcing screw head or a nut disposed axially along the forcing screw and distally from the forcing screw head.

Figure 1:
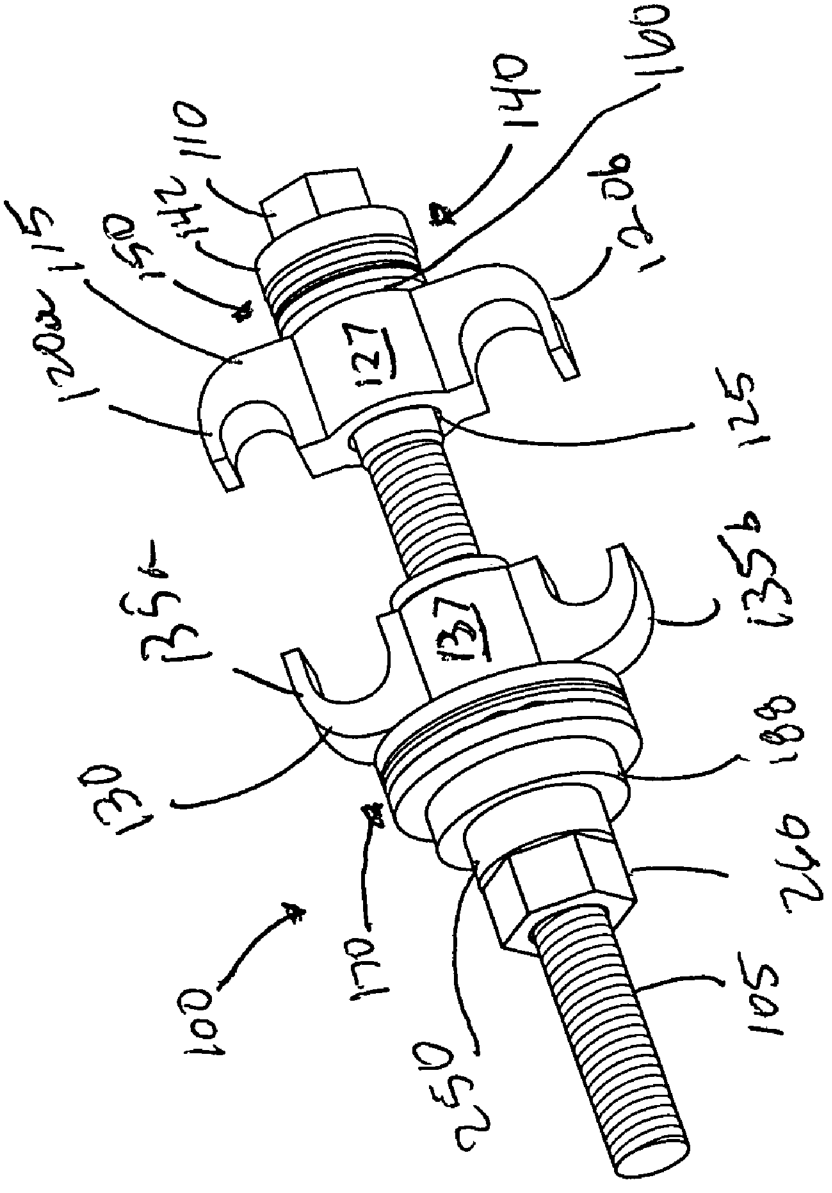
FIG. 1 is a perspective view of a strut spring compressor tool in accordance with the present invention.
Figure 2:
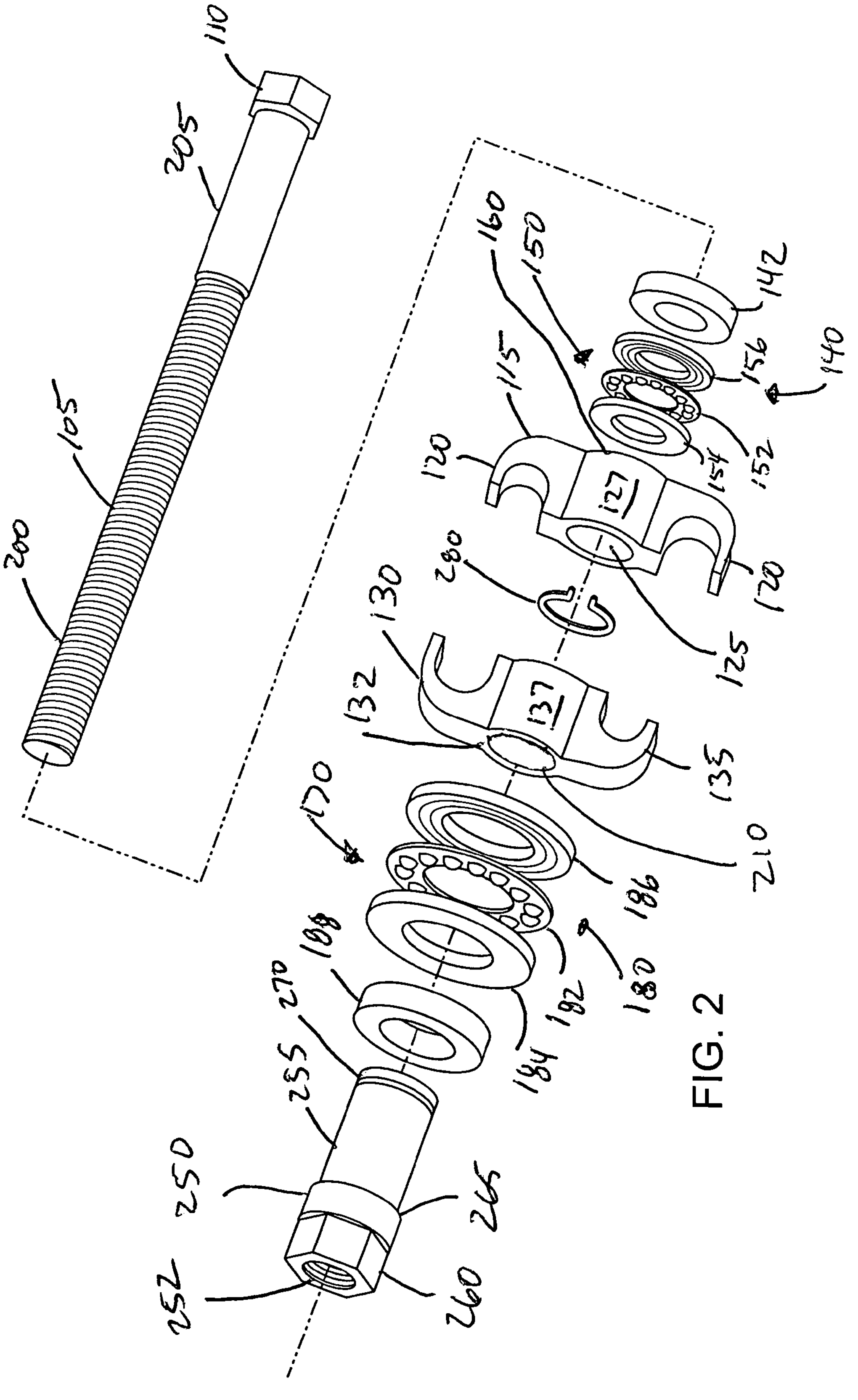
FIG. 2 is an exploded view of the strut spring compressor tool in accordance with the present invention.

With reference to FIG. 1 and FIG. 2, a strut spring compressor tool generally designated 100 is shown including a forcing screw 105. Forcing screw 105 may include a forcing screw head 110 which may include a hex head. Forcing screw head 110 may be driven either manually or by a power tool. With particular reference to FIG. 2, forcing screw 105 may include a threaded portion 200 and a non-threaded portion 205.

Figure 3:
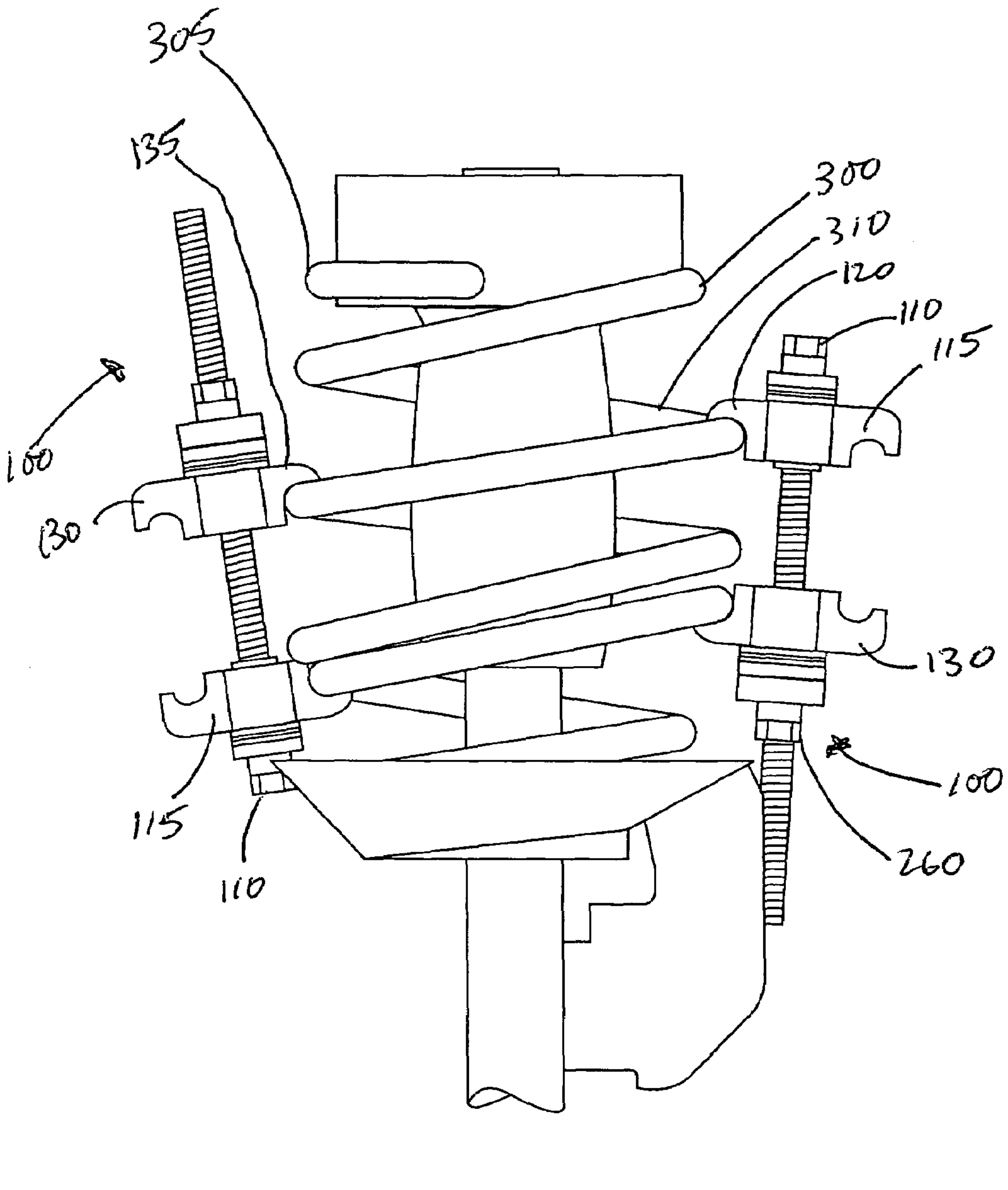
FIG. 3 is a front elevation view of a pair of strut spring compressor tools in use in accordance with the present invention.

A first clamping member 115 may be of unitary construction and formed of steel or other similar material. First clamping member 115 may include a pair of spring engaging members 120*a* and 120*b* sized to engage a coil spring 310 of a coiled spring component 305 of a strut assembly 300 (FIG. 3). Spring engaging member 120*a* may have a diameter of 13 mm and spring engaging member 120*b* may have a diameter of 17 mm. A bore 125 may be formed through a body portion 127 of the first clamping member 115, the bore 125 sized and adapted to accept the non-threaded portion 205 of the forcing screw 105. Body portion 127 may be formed intermediate the spring engaging members 120*a* and 120*b*. In such manner, the first clamping member 115 may freely rotate about the non-threaded portion 205 as the forcing screw 105 is rotated.

A second clamping member 130 may be of unitary construction and formed of steel or other similar material. Second clamping member 130 may include a pair of spring engaging members 135*a* and 135*b* sized to engage the coil spring 310 of the coiled spring component 305 of the strut assembly 300. Spring engaging member 135*a* may have a diameter of 13 mm and spring engaging member 135*b* may have a diameter of 17 mm. A bore 210 may be formed through a body portion 137 of the second clamping member 130, the bore 210 sized and adapted to accept a non-threaded portion 255 of a sleeve 250. Body portion 137 may be formed intermediate the spring engaging members 135. Movement of the threaded sleeve 250 along the forcing screw 105 will be described hereinafter.

To facilitate rotation of the forcing screw head 110, a first washer assembly generally designated 140 may be provided. First washer assembly 140 may include a thrust washer assembly generally designated 150 including a thrust bearing 152 disposed intermediate thrust washers 154 and 156. First washer assembly 140 further may include a first washer 142 disposed between the forcing screw head 110 and the thrust washer 156 in an assembled configuration such as shown in FIG. 1. In the assembled configuration, thrust washer assembly 150 may be disposed between the first washer 142 and a first washer surface 160 of the first clamping member 115.

A second washer assembly generally designated 170 may be provided to facilitate rotation of the second clamping member 130 about the non-threaded portion 255 of the threaded sleeve 250, particularly when a force is being applied to the threaded sleeve 250 by means of rotation of a head portion 260. Second washer assembly 170 may include a thrust washer assembly generally designated 180 including a thrust bearing 182 disposed intermediate thrust washers 184 and 186. Second washer assembly 170 may further include a second washer 188 disposed between a second washer surface 132 of the second clamping member 130 and a threaded sleeve shoulder 265 of the threaded sleeve 250.

To facilitate use of the strut spring compressor tool 100, the threaded sleeve 250 may include a groove 270 formed distally of the threaded sleeve head portion 260. In an assembled configuration, the second clamping member 130 and the second washer assembly 170 may be secured to the non-threaded portion 255 of the threaded sleeve 250 by means of snap ring 280. In this assembled configuration, the second clamping member 130 may freely rotate about the non-threaded portion 255 of the threaded sleeve 250 upon either rotation of the forcing screw 105 or rotation of the threaded sleeve 105. Furthermore, in this manner, the second clamping member 130, the second washer assembly 170, and the threaded sleeve 250 advantageously are fit together so that when they are removed from the forcing screw 105 the individual parts are not easily misplaced and lost.

With particular reference to FIG. 2, the threaded sleeve 250 may include a threaded bore 252 formed therethrough. Threaded bore 252 may be threaded and sized to accept the threaded portion 200 of the forcing screw 105. Rotation of the forcing screw 105 may move the second clamping member 130 relative to the first clamping member 115. Movement of the second clamping member 130 relative to the first clamping member 115 may also be achieved by rotation of the head portion 260 of the threaded sleeve 250.

With reference to FIG. 3, a pair of strut spring compressor tools 100 are shown in use with a strut assembly 300. Spring engaging members 120*a*, 120*b*, 135*a*, and 135*b* may engage coil spring 310 of the coiled spring component 305 dependent upon a diameter of the coil spring 310. Rotation of either the forcing screw head 110 or the head portion 260 effects movement of the second clamping member 130 relative to the first clamping member 115. In this manner, the coil spring 310 may be compressed to facilitate repair and maintenance of the strut assembly 300.

Advantageously, the strut spring compressor tool 100 of the present invention provides for a alternate means of moving the first and second clamping members 115 and 130 relative to one another. In the course of using the strut spring compressor tool 100 to compress a coiled spring component 305, a forcing screw head 110 may be positioned proximate an upper spring seat 350 of the strut assembly 300. In this case it may not be possible to apply rotational force to the forcing screw head 110 and rotational force may be applied to the head portion 260 of the threaded sleeve 250.

Figure 4:
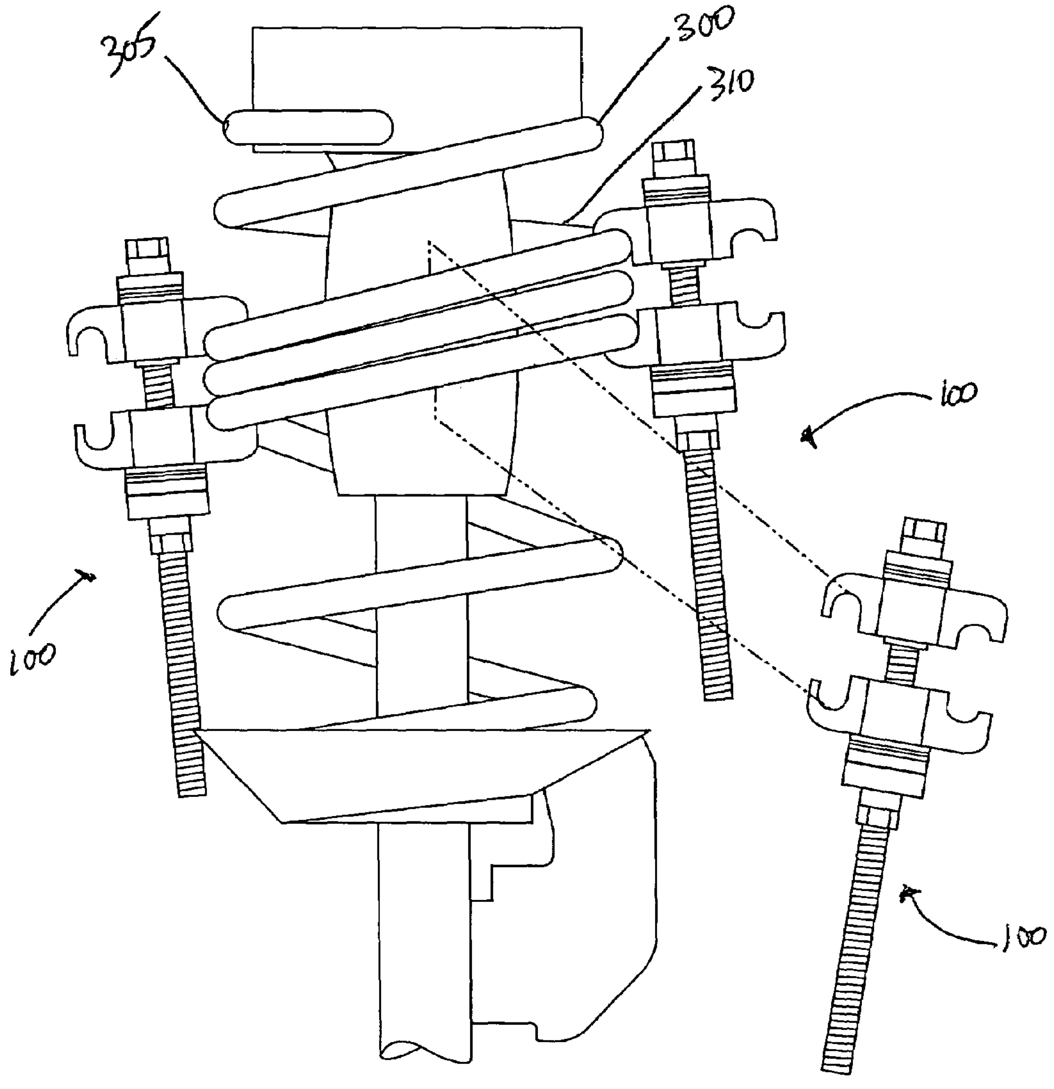
FIG. 4 is a front elevation view of three strut spring compressor tools in use in accordance with the present invention.

With reference to FIG. 4, three strut spring compressor tools 100 may be employed at 120 degrees from one another to compress the coil spring 310 of the coiled spring component 305. The use of three strut spring compressor tools 100 advantageously provides an added measure of safety to the user of the strut spring compressor tools 100.

For coiled spring components 305 having limited space between coils of the coil spring 310, the strut spring compressor tool 100 may be disassembled in order to affix the first and second clamping members 115 and 130 to the coils of coil spring 310. First the threaded sleeve 250 may be unthreaded from the forcing screw 105 and the spring engaging member 135*a* engagingly positioned on the coil spring 310. The first clamping member 115 may be slipped of the forcing screw 105 and the spring engaging member 120*a* engagingly positioned on the coil spring 310. The forcing screw 105 may then be inserted through the first clamping member 115 and threaded into the threaded sleeve 250.

The many features and advantages of the invention are apparent from the detailed specification, and thus, it is intended by the appended claims to cover all such features and advantages which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A tool for compressing a coil spring comprising:
- a forcing screw having a threaded portion and a non-threaded portion;
- a first clamping member rotatable about the non-threaded portion;
- a second clamping member rotatable about the threaded portion; and
- a second washer assembly disposed intermediate the second clamping member and a threaded sleeve head portion, the second washer assembly comprising a thrust washer assembly including a thrust bearing disposed between two thrust washers.

2. A tool for compressing a coil spring comprising:
- a forcing screw having a threaded portion and a non-threaded portion;
- a first clamping member rotatable about the non-threaded portion;
- a threaded sleeve rotatable about the threaded portion;
- a second clamping member rotatable about a non-threaded portion of the threaded sleeve; and
- a second washer assembly, the second washer assembly including a thrust washer assembly having a thrust bearing disposed between two thrust washers, the second washer assembly disposed intermediate the second clamping member and a head portion of the threaded sleeve.

3. The tool as claimed in claim 2, wherein the second washer assembly and the second clamping member are secured to the threaded sleeve by means of a snap ring engageable to a threaded sleeve groove.

4. A tool for compressing a coil spring comprising:
- a forcing screw having a threaded portion, a non-threaded portion and a head;
- a first clamping member rotatable about the non-threaded portion;
- a first washer assembly disposed between the first clamping member and the forcing screw head;
- a threaded sleeve rotatable about the threaded portion, the threaded sleeve having a head portion;
- a second clamping member rotatable about a non-threaded portion of the threaded sleeve; and
- a second washer assembly disposed between the second clamping member and the threaded sleeve head portion.

5. The tool as claimed in claim 4, wherein the first washer assembly comprises a thrust washer assembly.

6. The tool as claimed in claim 4, wherein the second washer assembly comprises a thrust washer assembly.

* * * * *